US012739295B2

(12) United States Patent
Kalam et al.

(10) Patent No.: US 12,739,295 B2
(45) Date of Patent: Sep. 15, 2026

(54) SYSTEM AND METHOD FOR AVOIDING DISCONNECTIONS DURING VIDEO CALLS

(71) Applicant: DISH Network L.L.C., Englewood, CO (US)

(72) Inventors: Arun Pulasseri Kalam, Karnataka (IN); Hariprasanth Mohanraj, Karnataka (IN)

(73) Assignee: DISH NETWORK L.L.C., Englewood, CO (US)

( * ) Notice: Subject to any disclaimer, the term of this patent is extended or adjusted under 35 U.S.C. 154(b) by 680 days.

(21) Appl. No.: 17/975,320

(22) Filed: Oct. 27, 2022

(65) Prior Publication Data

US 2024/0146440 A1 May 2, 2024

(51) Int. Cl.
*H04L 65/80* (2022.01)
*H04L 1/00* (2006.01)
*H04L 5/00* (2006.01)

(52) U.S. Cl.
CPC ............ *H04L 65/80* (2013.01); *H04L 1/0003* (2013.01); *H04L 1/0009* (2013.01); *H04L 5/0055* (2013.01)

(58) Field of Classification Search
CPC ..... H04L 65/80; H04L 1/0003; H04L 1/0009; H04L 5/0055; H04L 1/08; H04L 65/61
See application file for complete search history.

(56) References Cited

U.S. PATENT DOCUMENTS 9,420,510 B1 * 8/2016 Surmay ............ H04W 36/1446
9,635,647 B2 4/2017 Amini et al.
10,651,967 B1 * 5/2020 Zavurov ............ H04L 27/0008
2004/0081248 A1 * 4/2004 Parolari ................ H04L 1/0009 375/259
2008/0232301 A1 * 9/2008 Cai ...................... H04L 1/0009 370/328
2011/0222403 A1 * 9/2011 Suh ......................... H04L 47/24 370/231
2013/0286961 A1 10/2013 Vermani et al.
2016/0028992 A1 * 1/2016 Heatley ................ H04L 41/083 348/14.13
2017/0142696 A1 * 5/2017 Kim ...................... H04L 1/0009
(Continued)

FOREIGN PATENT DOCUMENTS

EP 3 721 593 B1 1/2022
JP 2018-157535 A 10/2018
WO 2018/162686 A1 9/2018

*Primary Examiner* — Rebecca E Song
*Assistant Examiner* — Cason H Morse
(74) *Attorney, Agent, or Firm* — Seed Intellectual Property Law Group LLP

(57) ABSTRACT

A method of operating a wireless system including an access point and a client device. The access point receives audio data and video data, transmits the audio data and video data using a first MCS, and transmits the audio data using a second MCS, where a code rate of the first MCS is greater than a code rate of the second MCS. The client device receives the audio data and the video data using the first MCS, receives the audio data using the second MCS, provides a first output that is generated using the audio data and the video data received using the first MCS, detects an interruption in the receiving of the audio data and the video data using the first MCS, and in response to detecting the interruption, provides a second output that is generated using the audio data received using the second MCS.

14 Claims, 7 Drawing Sheets

(56) References Cited

U.S. PATENT DOCUMENTS

| | | | | |
|---|---|---|---|---|
| 2020/0099596 | A1 * | 3/2020 | Sun | H04L 43/0823 |
| 2020/0383008 | A1 * | 12/2020 | Mallikarjunan | H04W 36/304 |
| 2021/0013990 | A1 * | 1/2021 | Chen | H04L 1/16 |
| 2024/0057099 | A1 * | 2/2024 | Abotabl | H04L 5/14 |

* cited by examiner

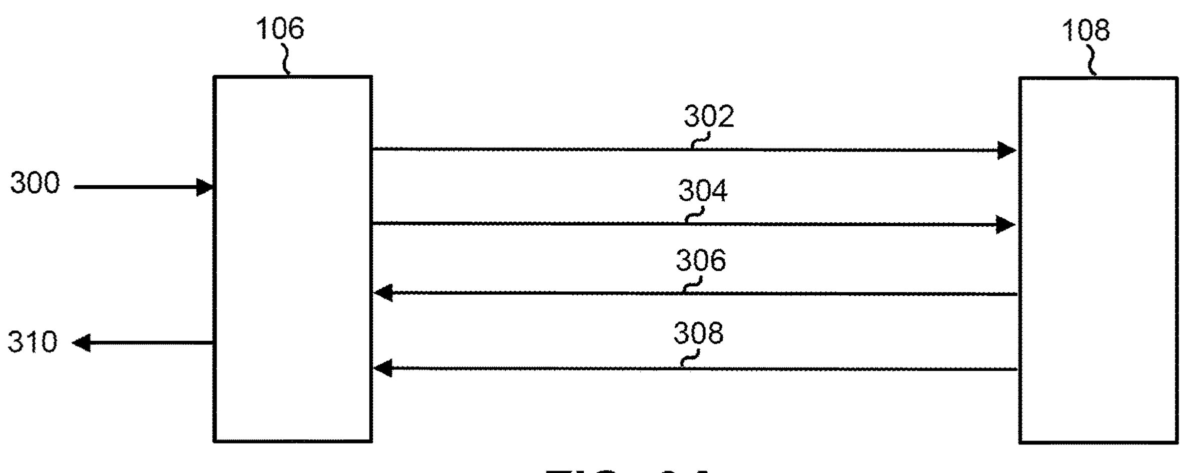
FIG. 3A
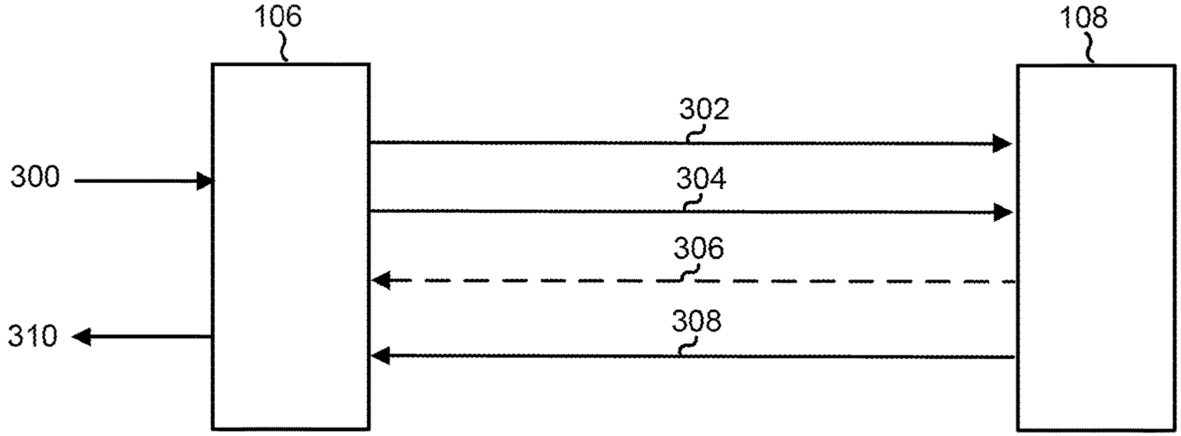
FIG. 3B
106
108
302
304
312
308
300
310
FIG. 3C

SYSTEM AND METHOD FOR AVOIDING DISCONNECTIONS DURING VIDEO CALLS

BACKGROUND

Today many people work from home and use the Internet for regular calls for official and personal purpose. As Internet usage and the number of devices connected to the Internet have increased, there are often Wi-Fi reliability issues in the form of Internet connection drops. A drop in Wi-Fi signal strength during a video call can be an extremely annoying event. Accordingly, there is a need to ensure interruption free calls that use Internet connections.

BRIEF SUMMARY

An access point device and a client device communicate with each other, for example, using Wi-Fi communications. The access point device and the client device agree upon a Modulation and Coding Scheme (MCS) to be used for optimum throughput. The MCS can be selected from multiple MCS levels or indices. With a lower MCS level or index, communication reliability is high, but throughput is low. Similarly, with a higher MCS level or index, communication reliability is low, but throughput is high. A high throughput is required for various user applications like high-resolution video calls, streaming videos, etc. A lower MCS level is good for many applications like low-resolution video calls, audio only calls, etc.

According to the present disclosure, the access point device and the client device communicate with each other using two MCS levels or indices in Time Division Multiplexing (TDM) manner. For example, the access point device and the client device communicate with each other MCS index 7 and MCS index 3, wherein MCS index 7 provides a higher level MCS than MCS index 3. Packets are exchanged between the access point device and the client device using both MCS index 7 and MCS index 3. Packets that include video call data are exchanged between the access point device and the client device using MCS index 7, to ensure a high-quality video call. Packets that include audio only call data are exchanged between the access point device and the client device using MCS index 3, to ensure a highly reliable audio only call.

When there is a disruption in Wi-Fi communication due to any type of interference, packets communicated using MCS index 7 are negatively affected more than packets communicated using MCS index 3. In a typical scenario, packets communicated using MCS index 7 are disrupted the connection for the video call drops thereby interrupting the video call. In this scenario, once a connection for the video call drops, the audio-only call is likely still available due to the high reliability of communicating using MCS index 3. Thus, the audio only call helps to ensure that there is no interruption in communications between parties, and the parties can continue to have a conversation while the video call connection is restored. A dropped video call connection may serve as a feedback mechanism such that a subsequent video call connection is established using a lower MCS level or index (e.g., MCS index 6), which is less prone to interruption than communications using MCS index 7. Thus, providing the subsequent video call connection using the lower MCS index may result in few interruptions to the video call and improve efficiency.

A method of operating a wireless system according to the present disclosure may be characterized as including: receiving, by an access point device, first video data and first audio data; transmitting, by the access point device, the first video data and the first audio data using a first Modulation and Coding Scheme (MCS); transmitting, by the access point device, the first audio data using a second MCS, a code rate of the first MCS being greater than a code rate of the second MCS; receiving, by a client device, the first audio data and the first video data using the first MCS; receiving, by the client device, the first audio data using the second MCS; outputting, by the client device, a first output based on the receiving the first audio data and the first video data using the first MCS; detecting, by the client device, an interruption in the receiving, by the client device, the first audio data and the first video data using the first MCS; and in response to the detecting, by the client device, the interruption in the receiving, by the client device, the first audio data and the first video data using the first MCS, outputting, by the client device, a second output based on the receiving the first audio data using the second MCS.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIGS. 3A, 3B, and 3C are diagrams for explaining operation of a communication system in accordance with embodiments described herein.

DETAILED DESCRIPTION

Figure 1:
FIG. 1 is a block diagram illustrating a communication system in accordance with embodiments described herein.
Figure 1:
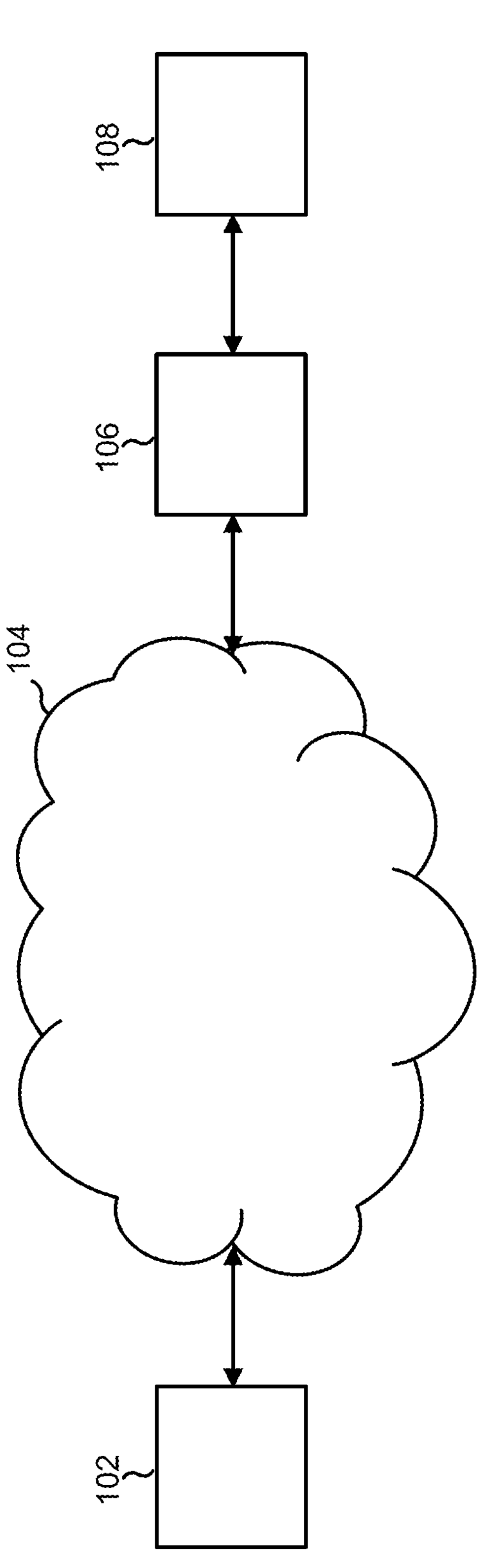

FIG. 1 is a block diagram illustrating a communication system 100 in accordance with embodiments described herein. The communication system 100 includes a communication device 102 that communicates via a wide-area network (WAN) 104 (e.g., Internet) with an access point device 106. The access point device 106 provides a wireless local-area network (WLAN) for communicating with a client device 108. In one or more implementations, the access point device 106 and the client device 108 communicate using one or more of the 802.11 family of standards (e.g., 802.11ac, 802.11ax, Wi-Fi, etc.) from the Institute of Electrical and Electronics Engineers (IEEE).

In one or more implementations, a video conferencing application executing on the communication device 102 communicates with a video conferencing application executing on the client device 108 to enable a user of the communication device 102 and a user of the client device 108 to have a video conference. During the video conference, a camera and a microphone connected to the communication device 102 generate video data and audio data, respectively, which is encoded and transmitted in a container to the client device 108 via the network 104 and the access point device 106. For example, the communication device 102 may transmit an MP4 container, which includes AAC or MP3 encoded audio data and MPEG or H.264 encoded video data, to the client device 108 via the network 104 and the access point device 106. The video conferencing application executing on the client device 108 decodes the video data and provides a corresponding video signal to a video display device (e.g., liquid crystal display (LCD)) of the client device 108, decodes the audio data, and provides one or more corresponding audio signals to one or more audio devices (e.g., speaker) of the client device 108.

Similarly, during the video conference, a camera and a microphone connected to the client device 108 generate video data and audio data, respectively, which is encoded and transmitted in a container (e.g., MP4 container) to the communication device 102 via the access point device 106 and the network 104. The video conferencing application executing on the communication device 102 decodes the video data and provides a corresponding video signal to a video display device (e.g., liquid crystal display (LCD)) of the communication device 102, decodes the audio data, and provides one or more corresponding audio signals to one or more audio devices (e.g., speaker) of the communication device 102.

In one or more implementations, the communication device 102 is a server that receives video data and audio data from a plurality of devices executing the video conferencing application, and transmits the received video data and audio data among those devices, to enable a video conference with more than two participants.

Figure 2A:
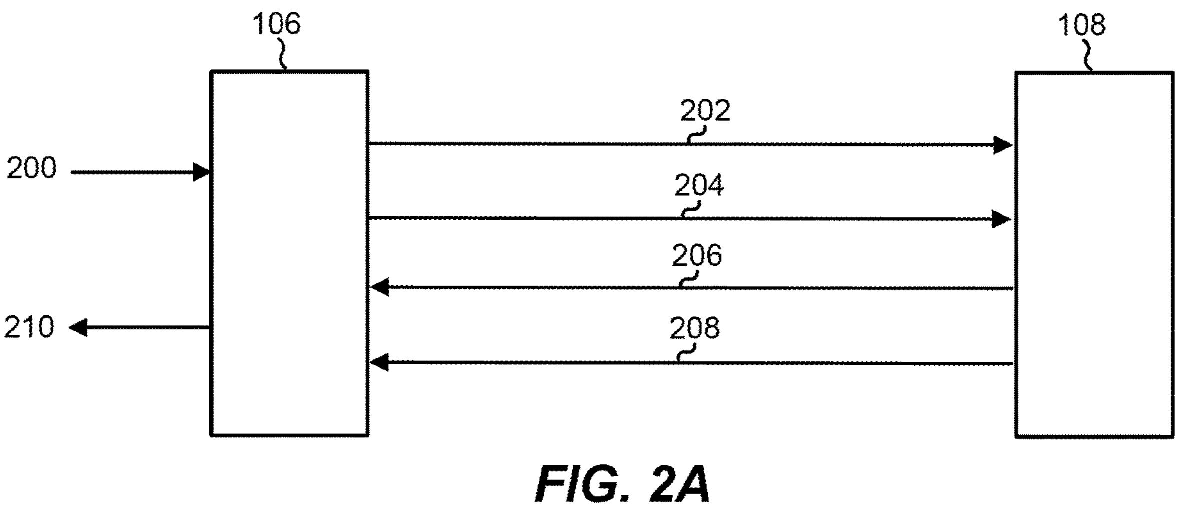
FIGS. 2A, 2B, and 2C are diagrams for explaining operation of a communication system in accordance with embodiments described herein.
Figure 2B:
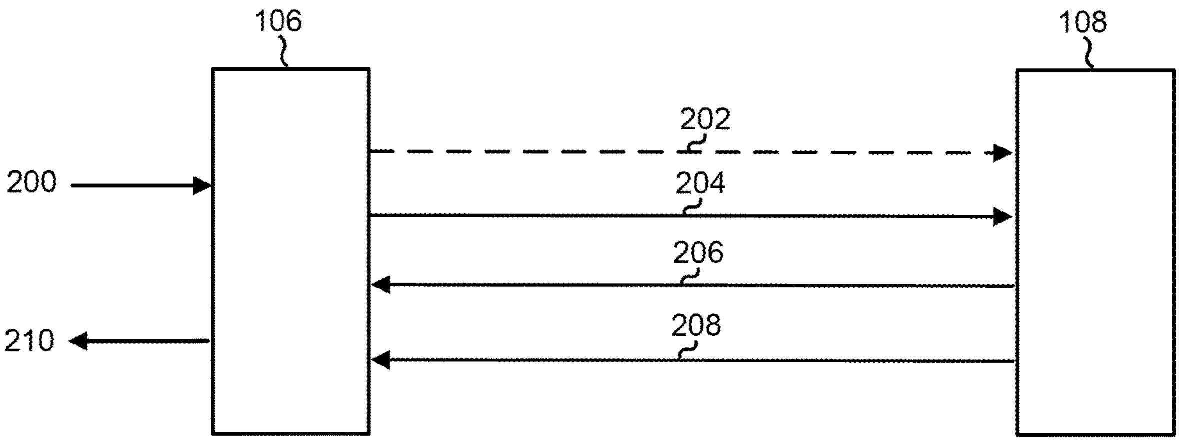
Figure 2C:
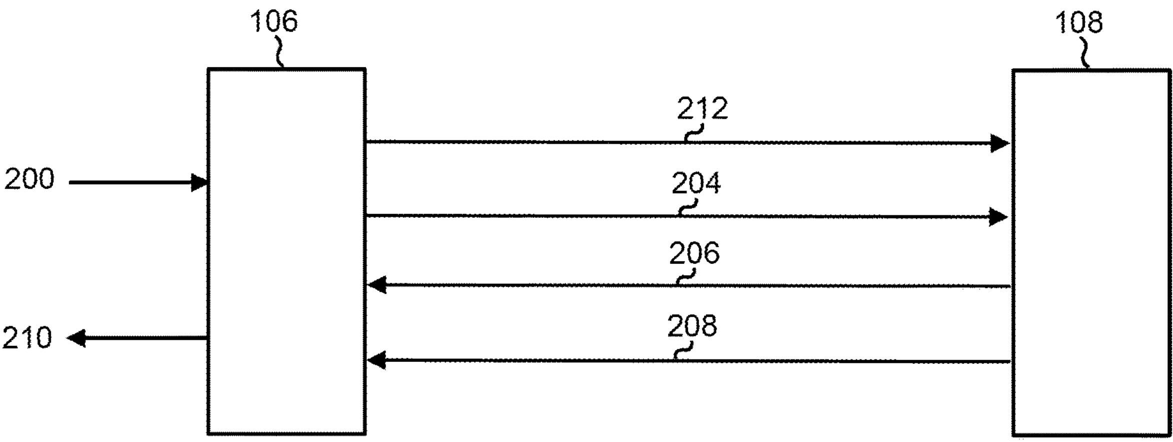

FIGS. 2A, 2B, and 2C are diagrams for explaining operation of the communication system 100 in accordance with embodiments described herein. As shown in FIG. 2A, the access point device 106 receives teleconference data 200 (e.g., from the communication device 102 via the network 104, which are not shown in FIG. 2A). The access point device 106 transmits audiovisual data 202, which is included in the teleconference data 200, to the client device 108 using a relatively high Modulation and Coding Scheme (MCS) level (e.g., MCS index 7). Additionally, the access point device 106 extracts audio data 204 from the teleconference data 200, and transmits the audio data 204 to the client device 108 using a relatively low MCS level (e.g., MCS index 3). Assuming that the audiovisual data 202 is successfully received and decoded by the client device 108, the client device 108 outputs video and audio signals corresponding to the audiovisual data 202, and does not output an audio signal based on the audio data 204.

The client device 108 transmits audiovisual data 206 to the access point device 106 using a relatively high MCS level (e.g., MCS index 7). Additionally, the client device 108 transmits audio data 208 that is included in the audiovisual data 206 to the access point device 106 using a relatively low MCS level (e.g., MCS index 3). Assuming that the audiovisual data 206 is received and successfully decoded by the access point device 106, the access point device 106 transmits teleconference data 210, which includes the audiovisual data 206, to the communication device 102.

FIG. 2B is similar in many relevant respects to FIG. 2A, except that there is a problem (e.g., interference, low signal strength caused by the client device moving away from the access point device, etc.) with transmission of the audiovisual data 202, as indicated by the dashed line in FIG. 2B. Thus, the audiovisual data 202 cannot be received or decoded by the client device 108. The audio data 204, however, is received and successfully decoded by the client device 108. Accordingly, the client device 108 switches from outputting video and audio signals corresponding to the audiovisual data 202, to outputting only audio signals corresponding to the audio data 204. In one more implementations, the client device 108 outputs a video signal for displaying a message indicating that there is a problem receiving the audiovisual data 202 from the access point device 106.

FIG. 2C is similar in many relevant respects to FIG. 2B, except that the access point device 106 transmits audiovisual data 212, which is included in the teleconference data 200, to the client device 108 using a relatively high MCS level (e.g., MCS index 6). Assuming that the audiovisual data 212 is successfully received and decoded by the client device 108, the client device 108 switches from outputting only audio signals corresponding to the audio data 204 to outputting video and audio signals corresponding to the audiovisual data 212.

In one or more implementations, an MCS index of 3 corresponds to 16 Quadrature Amplitude Modulation (QAM) and a coding rate of 1/2. Also, an MCS index of 6 corresponds to 64 QAM and a coding rate of 3/4. Additionally, an MCS index of 7 corresponds to 64 QAM and a coding rate of 5/6. The above MCS indices of 3, 6, and 7 are merely examples. Other MCS indices may be used without departing from the scope of the present application.

FIGS. 3A, 3B, and 3C are diagrams for explaining operation of the communication system 100 in accordance with embodiments described herein. As shown in FIG. 3A, the access point device 106 receives teleconference data 300 (e.g., from the communication device 102 via the network 104, which are not shown in FIG. 3A). The access point device 106 transmits audiovisual data 302, which is included in the teleconference data 300, to the client device 108 using a relatively high MCS level (e.g., MCS index 7). Additionally, the access point device 106 extracts audio data 304 from the teleconference data 300, and transmits the audio data 304 to the client device 108 using a relatively low MCS level (e.g., MCS index 3). Assuming that the audiovisual data 302 is successfully received and decoded by the client device 108, the client device 108 outputs video and audio signals corresponding to the audiovisual data 302, and does not output an audio signal based on the audio data 304.

The client device 108 transmits audiovisual data 306 to the access point device 106 using a relatively high MCS level (e.g., MCS index 7). Additionally, the client device 108 transmits audio data 308 that is included in the audiovisual data 304 to the access point device 106 108 using a relatively low MCS level (e.g., MCS index 3). Assuming that the audiovisual data 306 is received and successfully decoded by the access point device 106, the access point device 106 transmits teleconference data 310, which includes the audiovisual data 306, to the communication device 102.

FIG. 3B is similar in many relevant respects to FIG. 3A, except that there is a problem (e.g., interference, low signal strength caused by the client device moving away from the access point device, etc.) with transmission of the audiovisual data 306, as indicated by the dashed line in FIG. 3B. Thus, the audiovisual data 306 cannot be received or decoded by the access point device 106. The audio data 308, however, is received and successfully decoded by the access point device 106. Accordingly, the access point device 106 switches from transmitting teleconference data 310, which includes the audiovisual data 306, to transmitting teleconference data 310, which includes the audio data 308, to the communication device 102. In one more implementations, the access point device 106 transmits a message indicating that there is a problem receiving the audiovisual data 306 from the access point device 106.

FIG. 3C is similar in many relevant respects to FIG. 3B, except that the client device 108 transmits audiovisual data 312 to the access point device 106 using a relatively high MCS level (e.g., MCS index 6). Assuming that the audiovisual data 312 is successfully received and decoded by the access point device 106, the access point device 106 switches from transmitting teleconference data 310, which includes the audio data 308, to transmitting teleconference data 310, which includes the audiovisual data 312, to the communication device 102.

Figure 4:
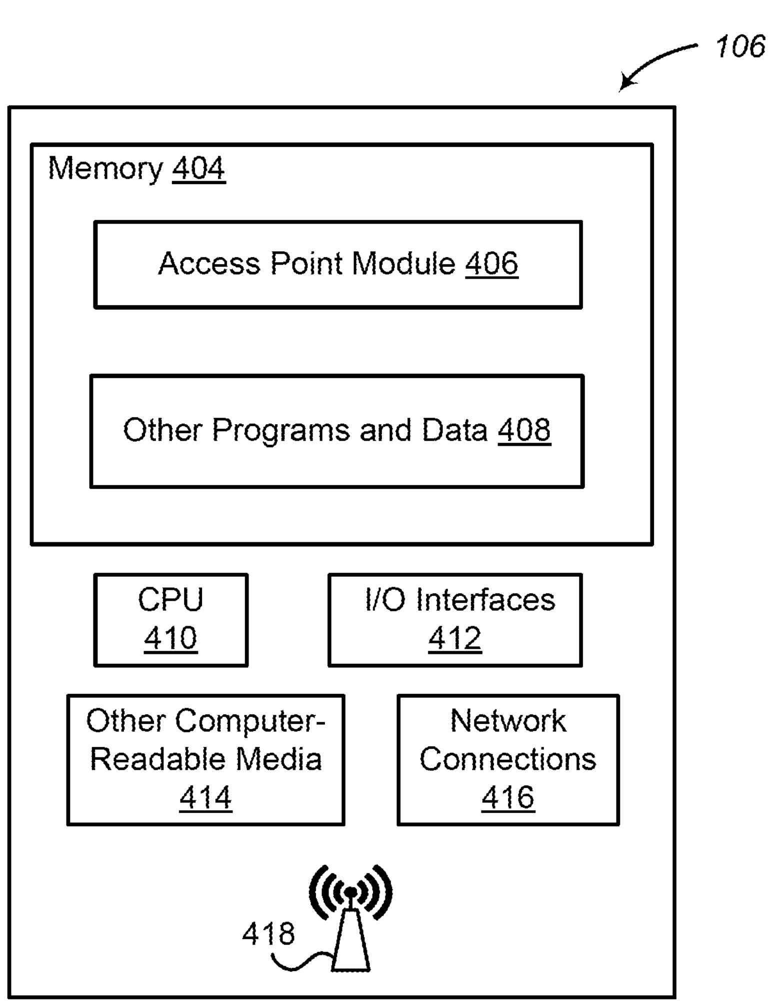
FIG. 4 is a block diagram illustrating an example of an access point device in accordance with embodiments described herein.

FIG. 4 is a block diagram illustrating an example of an access point device 106 in accordance with embodiments described herein. In some embodiments, one or more special-purpose computing systems may be used to implement the access point device 106. Accordingly, various embodiments described herein may be implemented in software, hardware, firmware, or in some combination thereof. The access point device 106 may include one or more memory devices 404, one or more CPUs 410, I/O interfaces 412, other computer-readable media 414, network connections 416, and a transceiver 418.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon an access point module 406. The access point module 406 is configured to implement and/or perform some or all of the functions of the access point device 106 described herein. The one or more memory devices 404 may also store other programs and data 408, which may include programs for operating as a layer 2 or layer 3 switch, programs transmitting and receiving data according to (e.g., using the Ethernet over Coax (EoC) standard, the Data Over Cable Service Interface Specifications (DOCSIS) standard, or the Multimedia over Coax Alliance (MoCA) standard), programs for communicating using IP based protocols, such as UDP and TCP, for example, and programs for communicating using one or more of the IEEE 802.11 communication standards (e.g., 802.11, 802.11a, 802.11, 802.11g, 802.11n, 802.11ac, 802.11ax, 802.11be).

Network connections 416 are configured to communicate with other devices including the communication device 102 and the client device 108. In various embodiments, the network connections 416 include wired network connections in accordance with the IEEE 802.3 communication standards or the DOCSIS standard, and wireless connections in accordance with one or more of the IEEE 802.11 communication standards (e.g., 802.11, 802.11a, 802.11, 802.11g, 802.11n, 802.11ac, 802.11ax, 802.11be). I/O interfaces 412 may include a USB interface, and other data input or output interfaces, or the like. Other computer-readable media 414 may include other types of stationary or removable computer-readable media, such as removable flash drives, external hard drives, or the like.

The transceiver 418 includes a transmitter and a receiver respectively configured to wirelessly transmit and receive radio frequency (RF) signals in accordance with one or more of the IEEE 802.11 communication standards (e.g., 802.11, 802.11a, 802.11, 802.11g, 802.11n, 802.11ac, 802.11ax, 802.11be). In one or more implementations, the transceiver 418 transmits and receives signals according to a plurality of Modulation and Coding Schemes (MCSs) defined in one or more of the IEEE 802.11 communication standards (e.g., 802.11, 802.11a, 802.11, 802.11g, 802.11n, 802.11ac, 802.11ax, 802.11be).

Figure 5:
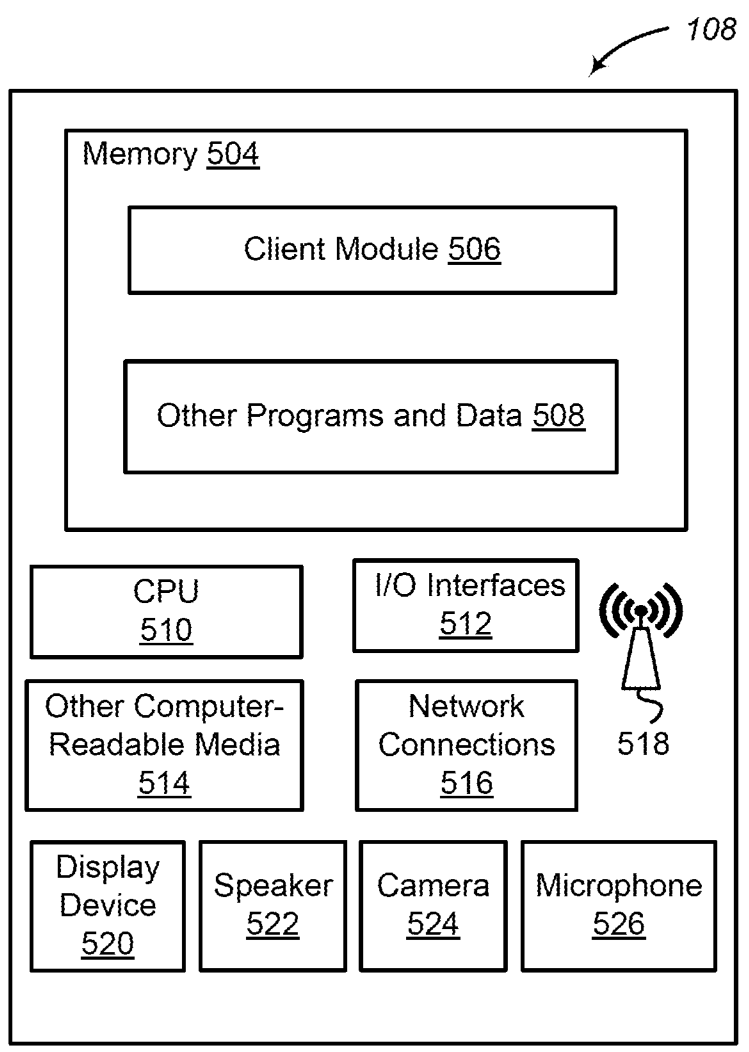
FIG. 5 is a block diagram illustrating an example of a client device in accordance with embodiments described herein.

FIG. 5 is a block diagram illustrating an example of a client device 108 in accordance with embodiments described herein. In some embodiments, one or more special-purpose computing systems may be used to implement the client device 108. Accordingly, various embodiments described herein may be implemented in software, hardware, firmware, or in some combination thereof. The client device 108 may include one or more memory devices 504, one or more CPUs 510, I/O interfaces 512, other computer-readable media 514, network connections 516, a transceiver 518, a display device 520, a speaker 522, a camera 524, and a microphone 526.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a client module 506. The client module 506 is configured to implement and/or perform some or all of the functions of the client device 108 described herein. The one or more memory devices 504 may also store other programs and data 508, which may include programs for operating as a client device of a wireless access point device, programs for performing video conferencing functions, programs for communicating using IP based protocols, such as UDP and TCP, for example, and programs for communicating using one or more of the IEEE 802.11 communication standards (e.g., 802.11, 802.11a, 802.11, 802.11g, 802.11n, 802.11ac, 802.11ax, 802.11be).

Network connections 516 are configured to communicate with other devices including the network device 102 and the router device 110. In various embodiments, the network connections 516 include wired connections in accordance with the Institute of Electrical and Electronics Engineers (IEEE) 802.3 communication standards, and wireless connections in accordance with one or more of the IEEE 802.11 communication standards (e.g., 802.11, 802.11a, 802.11, 802.11g, 802.11n, 802.11ac, 802.11ax, 802.11be) or IEEE 802.15 series communication standards (e.g., Bluetooth). I/O interfaces 512 may include a USB interface, Apple Lightning interface, and other data input or output interfaces, or the like. Other computer-readable media 514 may include other types of stationary or removable computer-readable media, such as removable flash drives, external hard drives, or the like.

The transceiver 518 includes a transmitter and a receiver respectively configured to wirelessly transmit and receive radio frequency (RF) signals in accordance with one or more of the IEEE 802.11 communication standards (e.g., 802.11, 802.11a, 802.11, 802.11g, 802.11n, 802.11ac, 802.11ax, 802.11be). In one or more implementations, the transceiver 518 transmits and receives signals according to a plurality of Modulation and Coding Schemes (MCSs) defined in one or more of the IEEE 802.11 communication standards (e.g., 802.11, 802.11a, 802.11, 802.11g, 802.11n, 802.11ac, 802.11ax, 802.11be).

In one or more embodiments, the display device 520 is a Liquid Crystal Display (LCD) device that displays information based on instructions from the one or more CPUs 510. In one or more implementations, the display device 520 includes a touchscreen device. The speaker 522 outputs sounds based on instructions from the one or more CPUs 510. The microphone 526 translates sound vibrations in the air into electronic signals used to generate audio data. The microphone 526 sends the audio data to the one or more CPUs 510, which cause the audio data to be transmitted from the client device 108 to the access point device 106. In one or more embodiments, the camera 524 includes a Charge Coupled Device (CCD) or Complementary Metal Oxide Semi-conductor (CMOS) based sensor and circuitry that converts light intensity levels detected by sensor elements into corresponding pixel values, which are output as pixel values in image data.

Figure 6:
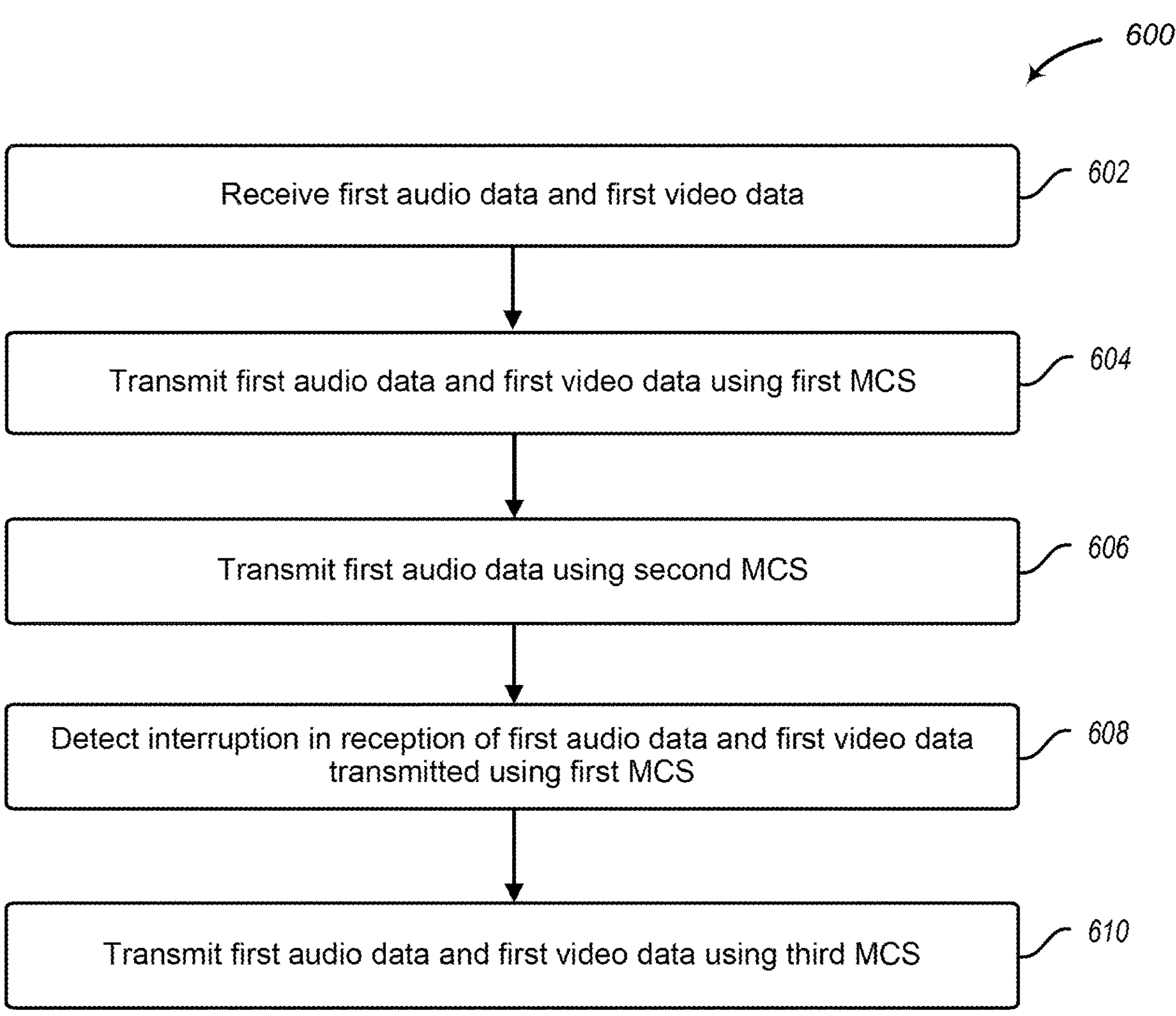
FIG. 6 illustrates a logical flow diagram showing an example of a method of operating an access point device in accordance with embodiments described herein.

FIG. 6 illustrates a logical flow diagram showing an example of a method 600 of operating an access point device in accordance with embodiments described herein. The method 600 begins at 602.

At 602, the access point device receives first audio data and first video data. For example, at 602, the access point device 106 receives the teleconference data 200, which includes the audio data and the first video data, as shown in FIG. 2A. In one or more implementations, the method 600 includes the communication device 102 and the network 104 (e.g., WAN/backhaul) transmitting the first audio data and the first video to the access point device 106. The method 600 then proceeds to 602.

At 604, the access point device transmits the first audio data and the first video data using a first MCS. For example, at 604, the access point device 106 transmits the audiovisual data 202, which includes the audio data and the first video data, using MCS index 7 to the client device 108, as shown in FIG. 2A. The method 600 then proceeds to 606.

At 606, the access point device transmits the first audio data using a second MCS. For example, at 606, the access point device 106 transmits the audio data 204, which includes the first audio data, using MCS index 3 to the client device 108, as shown in FIG. 2A. The method 600 then proceeds to 608.

At 608, the access point device detects an interruption in reception of the first audio data and the first video data transmitted using the first MCS. For example, at 608, the access point device 106 receives a message including a negative acknowledgement for the audiovisual data 202, which includes the audio data and the first video data, from the client device 108. The method 600 then proceeds to 610.

At 610, the access point device transmits the first audio data and the first video data using a third MCS. For example, at 610, the access point device 106 transmits the audiovisual data 212, which includes the first audio data and the first video data, using MCS index 6 to the client device 108, as shown in FIG. 2C. The method 600 then ends.

Figure 7:
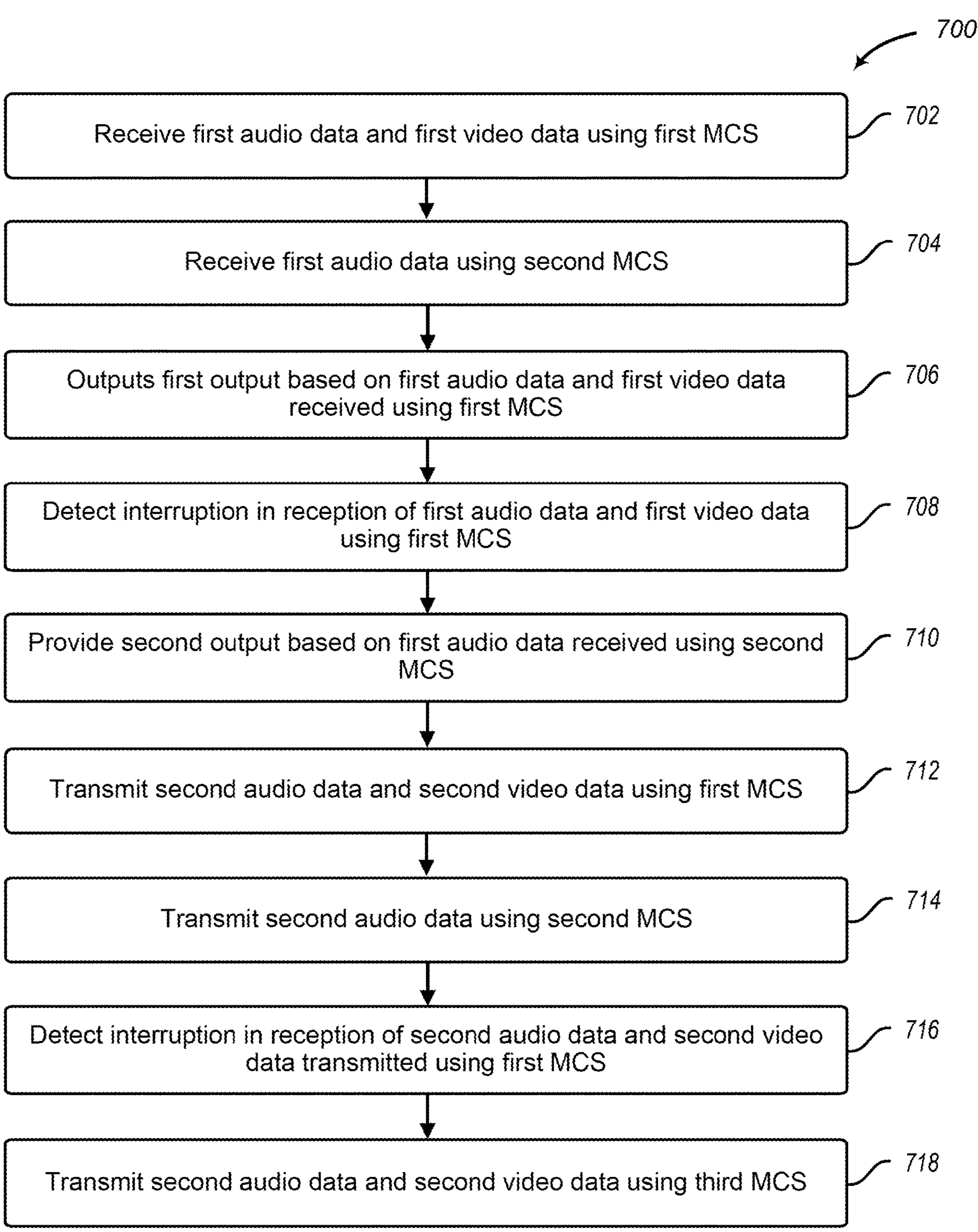
FIG. 7 illustrates a logical flow diagram showing an example of a method of operating a client device in accordance with embodiments described herein.

FIG. 7 illustrates a logical flow diagram showing an example of a method 700 of operating a client device in accordance with embodiments described herein. The method 700 begins at 702.

At 702, the client device receives first audio data and first video data using a first MCS. For example, at 702, the client device 108 receives the audiovisual data 302, which includes the audio data and first video data, using MCS index 7 from the access point device 106, as shown in FIG. 3A. The method 700 then proceeds to 702.

At 704, the client device receives the first audio data using a second MCS. For example, at 704, the client device 108 receives the audio data 304, which includes the first audio data, using MCS index 3 from the access point device 106, as shown in FIG. 3A. The method 700 then proceeds to 706.

At 706, the client device outputs or otherwise provides a first output based on the first audio data and the first video data received using the first MCS. For example, at 706, the client device 108 will output video data from the display device 520 and audio data from the speaker 522 based on the audiovisual data 302, which includes the audio data and first video data. The method 700 then proceeds to 708.

At 708, the client device detects an interruption in reception of the first audio data and the first video data received using the first MCS. For example, at 708, the client device 108 receives a message including a decoding failure for the audiovisual data 302, which includes the audio data and first video data, from the transceiver 418. The method 700 then proceeds to 710.

At 710, the client device provides, either by output or other technique, a second output based on the first audio data received using the second MCS. For example, at 710, the client device 108 provides only audio output from the speaker 522 that is generated using the audio data 304, which includes the first audio data. The method 700 then proceeds to 712.

At 712, the client device transmits second audio data and second video data using the first MCS. For example, at 712, the client device 108 transmits the audiovisual data 306, which includes the second audio data and the second video data, using MCS index 7 to the access point device 106, as shown in FIG. 3A. The method 700 then proceeds to 714.

At 714, the client device transmits the second audio data using a second MCS. For example, at 714, the client device 108 transmits the audio data 308, which includes the second audio data, using MCS index 3 to the access point device 106, as shown in FIG. 3A. The method 700 then proceeds to 716.

At 716, the client device detects an interruption in reception of the second audio data and the second video data transmitted using the first MCS. For example, at 716, the client device 108 receives a message including a negative acknowledgement for the audiovisual data 306, which includes the second audio data and the second video data, from the access point device 106. The method 700 then proceeds to 718.

At 718, the client device transmits the third audio data and the second video data using a third MCS. For example, at 718, the client device 108 transmits the audiovisual data 312, which includes the second audio data and the second video data, using MCS index 7 to the access point device 106, as shown in FIG. 3C. The method 700 then proceeds ends.

The various embodiments described above can be combined to provide further embodiments. Aspects of the embodiments can be modified, if necessary to employ concepts of the various patents, applications and publications to provide yet further embodiments. For example, although the access point device is described as transmitting both the first audio data and the first video data using the first MCS, the access point device can transmit only the first video data using the first MCS within the scope of the present disclosure. Also, although the access point device is described as transmitting only the first audio data using the second MCS, the access point device can transmit both the first audio data and the first video data using the second MCS without departing from the scope of the present disclosure. By way of another example, although the client device is described as transmitting both the second audio data and the second video data using the first MCS, the client device can transmit only the second video data using the first MCS without departing from the scope of the present disclosure. Also, although the client device is described as transmitting only the second audio data using the second MCS, the client device can transmit both the second audio data and the second video data using the second MCS without departing from the scope of the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wireless system, the method comprising:

receiving, by an access point device, first video data and first audio data;

transmitting, by the access point device, the first video data and the first audio data using a first Modulation and Coding Scheme (MCS);

transmitting, by the access point device, the first audio data using a second MCS, a code rate of the first MCS being greater than a code rate of the second MCS;

receiving, by a client device, the first audio data and the first video data using the first MCS;

receiving, by the client device, the first audio data using the second MCS;

outputting, by the client device, a first output based on the received first audio data and the first video data using the first MCS;

detecting, by the client device, an interruption in the receiving, by the client device, the first audio data and the first video data using the first MCS;

in response to detecting the interruption in the receiving of the first audio data and the first video data using the first MCS:

switching, by the client device, from outputting the first output using the first MCS to outputting a second output based on continuing to receive the first audio data using the second MCS;

receiving, by the access point device, a message indicating the interruption of the client device receiving the first video data and first audio data using the first MCS;

continuing transmission, by the access point device, the first video data and the first audio data using a third MCS that has a code rate less than the code rate of the first MCS;

determining, by the client device, that the first audio data and the first video data using the third MCS is successfully received; and in response to determining that the first audio data and the first video data using the third MCS is successfully received:

switching, by the client device, from outputting the second output using the second MCS to outputting a third output based on continuing to receive the first audio data and the first video data using the third MCS, and wherein the first MCS has an MCS index of 7, the second MCS has an MCS index of 3, and the third MCS has an MCS index of 6.

2. The method according to claim 1 wherein the transmitting, by the access point device, the first video data and the first audio data using the first MCS and the transmitting, by the access point device, the first audio data using the second MCS are performed using Time Division Multiplexing (TDM).

3. The method according to claim 1 wherein the transmitting, by the access point device, the first audio data using the second MCS, includes the transmitting, by the access point device, the first audio data without the first video data using the second MCS.

4. The method according to claim 1, further comprising:

transmitting, by the client device to the access point device, second audio data and second video data using the first MCS; and transmitting, by the client device to the access point device, the second audio data using the second MCS.

5. The method according to claim 4, further comprising:

receiving, by the access point device, the second audio data and the second video data using the first MCS;

detecting, by the client device, an interruption in the receiving, by the access point device, the second audio data and the second video data using the first MCS; and in response to the detecting, by the client device, the interruption in the receiving, by the access point device, the second audio data and the second video data using the first MCS, transmitting, by the client device, the second audio data and the second video data using the third MCS.

6. The method according to claim 1 wherein detecting, by the client device, an interruption in the receiving, by the client device, the first audio data and the first video data using the first MCS includes:

receiving one or more packets, each of the one or more packets including the first audio data and the first video data; and detecting an error in each of the one or more packets including the first audio data and the first video data.

7. An access point device that communicates with a client device, the access point device comprising:

at least one memory that stores computer executable instructions; and at least one processor that executes the computer executable instructions to cause actions to be performed, the actions including:

receive first video data and first audio data;

begin transmission of the first video data and the first audio data using a first Modulation and Coding Scheme (MCS);

begin transmission of the first audio data using a second MCS, wherein a code rate of the first MCS is greater than a code rate of the second MCS;

cause the client device to switch from outputting the first video data and the first audio data based on the first MCS to outputting the first audio data based on the second MCS in response to an interruption in reception by the client device of the first video data and the first audio data transmitted using the first MCS;

receive a message indicating the interruption in reception by the client device of the first video data and the first audio data transmitted using the first MCS; and in response to receiving the message indicating the interruption in reception by the client device of the first video data and the first audio data transmitted using the first MCS:

continue transmission of the first video data and the first audio data using a third MCS, wherein the code rate of the first MCS is greater than a code rate of the third MCS; and cause the client device to switch from outputting the first audio data based on the second MCS to outputting the first video data and the first audio data based on the third MCS in response to successfully receiving the first video data and the first audio data transmitted using the third MCS; and wherein the first MCS has an MCS index of 7, the second MCS has an MCS index of 3, and the third MCS has an MCS index of 6.

8. The access point device according to claim 7 wherein the actions include:

transmit the first video data and the first audio data using the first MCS and transmit the first audio data using the second MCS using Time Division Multiplexing (TDM); and transmit the first video data and the first audio data using the third MCS and transmit the first audio data using the second MCS using Time Division Multiplexing (TDM).

9. The access point device according to claim 7 wherein the actions include:

receive second video data and second audio data from the client device using the first MCS and receive the second audio data from the client device using the second MCS using Time Division Multiplexing (TDM).

10. A client device that communicates with an access point device, the client device comprising:

at least one memory that stores computer executable instructions; and at least one processor that executes the computer executable instructions to cause actions to be performed, the actions including:

receive first audio data and first video data from the access point device using a first Modulation and Coding Scheme (MCS);

receive the first audio data from the access point device using a second MCS, wherein a code rate of the first MCS is greater than a code rate of the second MCS;

provide a first output based on the first audio data and the first video data received from the access point device using the first MCS;

detect an interruption in reception of the first audio data and first video data from the access point device using the first MCS; and in response to detection of the interruption in reception of the first audio data and first video data from the access point device using the first MCS continue to receive the first audio data from the access point device using the second MCS; and switch from providing the first output based on the first MCS to providing a second output based on the first audio data being continually received from the access point device using the second MCS in response to determining that the first audio data and the first video data using a third MCS is successfully received from the access point device, wherein a code rate of the third MCS is less than the code rate of the first MCS:

switching from providing the second output based on the second MCS to providing a third output based on the first audio data and the first video data being continually received from the access point device using the third MCS; and wherein the first MCS has an MCS index of 7, the second MCS has an MCS index of 3, and the third MCS has an MCS index of 6.

11. The client device according to claim 10 wherein the actions include:

receive the first video data and the first audio data using the first MCS and receive the first audio data using the second MCS using Time Division Multiplexing (TDM).

12. The client device according to claim 10 wherein the actions include:

cause a display device to output video and cause an audio device to output sound based on the first audio data and the first video data received from the access point device using the first MCS, to provide the first output based on the first audio data and the first video data received from the access point device using the first MCS; and cause the audio device to output sound based on the first audio data received from the access point device using the second MCS, to provide the second output based on the first audio data received from the access point device using the second MCS.

13. The client device according to claim 10 wherein the actions include:

transmit second audio data and second video data to the access point device using the first MCS and transmit the second audio data using the second MCS using Time Division Multiplexing (TDM).

14. The client device according to claim 13 wherein the actions include:

detect an interruption in reception by the access point device of the second audio data and the second video data transmitted using the first MCS; and in response to detection of the interruption in reception by the access point device of the second audio data and the second video data transmitted using the first MCS, transmit the second audio data and the second video data using the third MCS and transmit the second audio data using the second MCS using TDM.

* * * * *